US012718680B2

(12) United States Patent
Ramesh et al.

(10) Patent No.: US 12,718,680 B2
(45) Date of Patent: Aug. 25, 2026

(54) INTERNET OF THINGS DEVICE-BASED MONITORING AND ALERTING

(71) Applicant: ROKU, INC., San Jose, CA (US)

(72) Inventors: Sunil Ramesh, Saratoga, CA (US); Michael Cutter, Golden, CO (US); Robert C. Curtis, Los Gatos, CA (US); Patrick A. Brouillette, Tempe, AZ (US); Gregory M. Garner, Key Colony Beach, FL (US)

(73) Assignee: Roku, Inc., San Jose, CA (US)

( * ) Notice: Subject to any disclaimer, the term of this patent is extended or adjusted under 35 U.S.C. 154(b) by 164 days.

(21) Appl. No.: 18/371,033

(22) Filed: Sep. 21, 2023

(65) Prior Publication Data

US 2025/0104550 A1 Mar. 27, 2025

(51) Int. Cl.
*G08B 25/00* (2006.01)
*G06F 40/20* (2020.01)
*G16Y 40/10* (2020.01)

(52) U.S. Cl.
CPC ............ *G08B 25/00* (2013.01); *G06F 40/20* (2020.01); *G16Y 40/10* (2020.01)

(58) Field of Classification Search
CPC .................................................... G08B 25/00
See application file for complete search history.

(56) References Cited

U.S. PATENT DOCUMENTS 9,711,036 B2 * 7/2017 Fadell .................. G06Q 10/063
2014/0266669 A1 * 9/2014 Fadell .................. G08B 19/00 340/501
2015/0106061 A1 * 4/2015 Yang .................. H04L 12/2827 702/188
2015/0109112 A1 * 4/2015 Fadell .................. G08B 19/005 340/328
2015/0109128 A1 * 4/2015 Fadell .................. G08B 25/008 340/540
2015/0116106 A1 * 4/2015 Fadell ................ G06Q 10/0631 340/501
2015/0116107 A1 * 4/2015 Fadell .................. G06Q 10/083 340/501
2015/0116108 A1 * 4/2015 Fadell .................. G08B 27/003 340/501
2015/0116109 A1 * 4/2015 Fadell ................ G06Q 10/0631 340/501

(Continued)

*Primary Examiner* — Travis R Hunnings

(74) *Attorney, Agent, or Firm* — STERNE, KESSLER, GOLDSTEIN & FOX P.L.L.C.

(57) ABSTRACT

Disclosed herein are system, method and/or computer program product embodiments, and/or combinations and sub-combinations thereof for providing a monitoring and alerting service for a premises comprising a set of Internet of Things (IoT) devices. An example embodiment operates by analyzing one or more of user input provided to the monitoring and alerting service or sensor data collected from at least the set of IoT devices, defining, based at least on the analyzing, an event whose occurrence can be monitored for using at least one or more IoT devices in the set of IoT devices, monitoring for an occurrence of the event using at least the one or more devices in the set of IoT devices, detecting the occurrence of the event based on the monitoring and, in response to detecting the occurrence of the event, generating an alert.

20 Claims, 9 Drawing Sheets

(56) References Cited

U.S. PATENT DOCUMENTS

| | | | | |
|---|---|---|---|---|
| 2015/0154850 | A1* | 6/2015 | Fadell .................. | G06Q 10/083 340/501 |
| 2023/0315955 | A1* | 10/2023 | Karadimitriou ......... | G01C 7/06 703/6 |

* cited by examiner

INTERNET OF THINGS DEVICE-BASED MONITORING AND ALERTING

BACKGROUND

Field

This disclosure is generally directed to a monitoring and alerting service for a premises and, in particular, to a monitoring and alerting service for a premises that is implemented utilizing one or more Internet of Things (IoT) devices installed on the premises.

SUMMARY

Provided herein are system, apparatus, article of manufacture, method and/or computer program product embodiments, and/or combinations and sub-combinations thereof, for providing a monitoring and alerting service for a premises comprising a set of IoT devices. An example embodiment performs operations including analyzing one or more of user input provided to the monitoring and alerting service or sensor data collected from at least the set of IoT devices, defining, based at least on the analyzing, an event whose occurrence can be monitored for using at least one or more IoT devices in the set of IoT devices, monitoring for an occurrence of the event using at least the one or more devices in the set of IoT devices, detecting the occurrence of the event based on the monitoring, and in response to detecting the occurrence of the event, generating an alert.

In an embodiment, the operations further include presenting, via a user interface of the monitoring and alerting service, an option to monitor for the event, and the monitoring, the detecting, and the generating operations are performed in response to a user exercising the option.

In another embodiment, the analyzing the sensor data collected from at least the set of IoT devices comprises analyzing sensor data collected from the set of IoT devices and one or more other sets of IoT devices of one or more other premises, respectively.

In yet another embodiment, defining the event comprises defining one or more of (i) a set of conditions to be monitored for, wherein the event is deemed to have occurred when the set of conditions are met, (ii) a set of IoT devices that are capable of monitoring for one or more conditions in the set of conditions, or (iii) a set of event detection algorithms for detecting one or more conditions in the set of conditions.

In further accordance with such an embodiment, the set of event detection algorithms may include a machine learning (ML) model and defining the set of event detection algorithms may comprise training the ML model utilizing at least sensor data collected from one or more IoT devices in the set of IoT devices.

In still further accordance with such an embodiment, the set of conditions to be monitored for may include at least one condition that is monitored for by accessing a data source external to the premises.

In a further embodiment, analyzing the user input provided to the monitoring and alerting service comprises analyzing natural language user input provided to the monitoring and alerting service using at least a large language model (LLM).

In a still further embodiment, analyzing the sensor data collected from at least the set of IoT devices comprises analyzing the sensor data collected from at least the set of IoT devices to detect an anomalous set of conditions, and defining the event based at least on the analyzing comprises defining the event based at least on the anomalous set of conditions.

In a yet further embodiment, analyzing the sensor data collected from at least the set of IoT devices comprises analyzing the sensor data collected from at least the set of IoT devices to detect a set of conditions that are associated with a standard event type, and defining the event based at least on the analyzing comprises defining the event based at least on the set of conditions that are associated with the standard event type.

In an additional embodiment, generating the alert comprises determining a context of a user of the monitoring and alerting service, selecting one or more devices from among a plurality of devices capable of generating the alert based on the context of the user, and generating the alert via the selected one or more devices.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
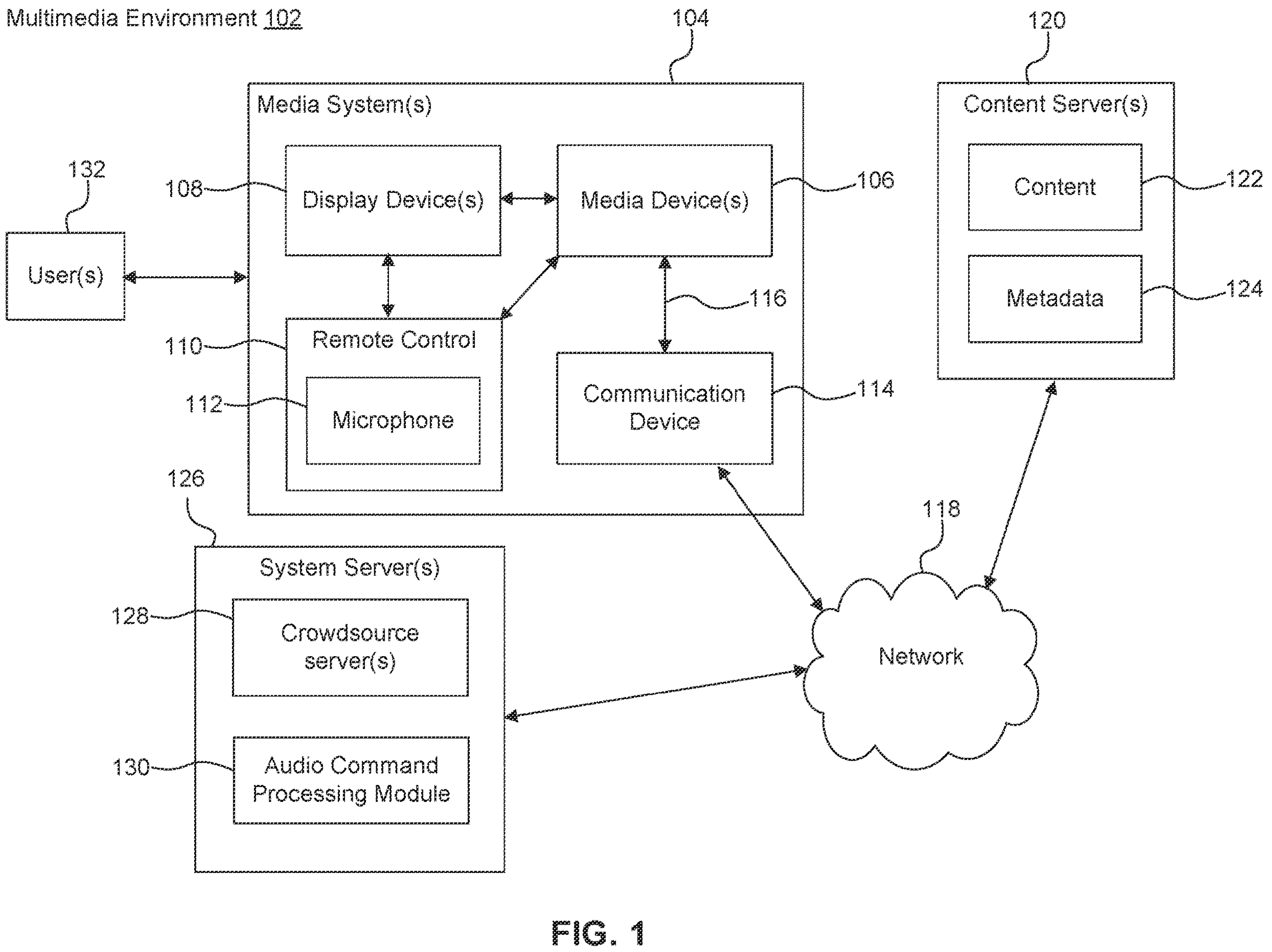
FIG. 1 illustrates a block diagram of a multimedia environment, according to some embodiments.

Modern living and working spaces, such as homes, hotels, or offices, are increasingly equipped with many devices that are configured to engage in digital communications. These devices may range from traditional internet-connected devices such as personal computers, telephone systems, security systems, gaming systems, and over-the-top (OTT) streaming media players, to newer devices including "smart home" devices such as connected appliances, utilities, lights, switches, power outlets, and speakers, as well as wearable devices such as watches and/or health monitors, among countless other examples. These devices may generally be referred to as "Internet of Things" (IoT) devices.

Some IoT devices are configured to monitor for a particular event and to alert a user when the event is detected. For example, some smart doorbells utilize an integrated camera to monitor for motion on a doorstep and to alert a user when such motion is detected. However, such IoT devices are typically specially designed to monitor for only a very limited set of predefined events. Furthermore, such IoT devices typically cannot be adapted by a user to monitor for other types of events about which the user may wish to be alerted. Still further, a given user may own a diverse set of IoT devices, but such IoT devices typically cannot operate together to perform event monitoring and alerting operations unless they are manufactured by the same company and configured from the outset to do so.

IoT devices may be very expensive. Consequently, replacing unconnected devices in a home or office that are incapable of digital communication with connected devices that are capable of digital communication can cost a homeowner or business a considerable amount of money, and in some cases such upgrading may be prohibitively expensive.

Provided herein are system, apparatus, device, method and/or computer program product embodiments, and/or combinations and sub-combinations thereof, for providing an IoT device-based monitoring and alerting service for a premises that addresses one or more of the foregoing issues associated with conventional IoT devices. Providing the monitoring and alerting service may include (i) analyzing one or more of user input provided to the monitoring and alerting service or sensor data collected from at least a set of IoT devices of the premises, (ii) defining, based at least on the analyzing, an event whose occurrence can be monitored for using at least one or more IoT devices in the set of IoT devices, (iii) monitoring for an occurrence of the event using at least the one or more devices in the set of IoT devices, (iv) detecting the occurrence of the event based on the monitoring, and (v) in response to detecting the occurrence of the event, generating an alert.

As will be discussed herein, the monitoring and alerting service may advantageously utilize the IoT devices installed on a premises to monitor for a wide variety of different events that are outside of the limited set of predefined events supported by conventional IoT devices.

In certain scenarios, the monitoring and alerting service may operate to extend "smart home" features to an unconnected device within a premises. For example, the monitoring and alerting service may utilize one or more IoT devices within the premises to monitor a state of the unconnected device and generate an alert based on a detected change in state of the unconnected device. Such feature can enable a homeowner to leverage unconnected devices in providing smart home features, such as smart home security features, without having to replace such unconnected devices with connected devices.

The monitoring and alerting service may also utilize one or more IoT devices within a premises to monitor a state of a device that is connected to a first service so that, when a change in state of the device is detected, an alert may be generated via a second service that is otherwise unconnected to the first service. For example, the one or more IoT devices may be connected to the second service.

The monitoring and alerting service may further utilize one or more IoT devices within a premises to monitor a state of a connected or unconnected device within the premises to detect when the device is not operating or is operating in a degraded capacity and to alert a user of the same.

The monitoring and alerting service may also utilize one or more IoT devices within a premises to amplify an alert generated by another device within the premises to help increase a likelihood that the alert is observed by an appropriate user or entity.

The monitoring and alerting service may operate to define new events that may be monitored for by one or more IoT devices in a premises. For example, the monitoring and alerting service may analyze user input (e.g., natural language user input) provided thereto and define an event based at least on the analysis of the user input. As another example, the monitoring and alerting service may analyze sensor data collected from a set of IoT devices within a premises and dynamically define an event based at least on the analysis of such sensor data. The service may present the event to the user to determine if the user wishes to activate monitoring therefor. Thus, the monitoring and alerting service may enable a user to easily establish a custom set of events for which monitoring should be performed and may utilize the user's own IoT devices to monitor for such events and generate alerts when they are detected.

The monitoring and alerting service may operate to identify one or more IoT devices within a set of IoT devices of a premises that are capable of monitoring for a particular event. The monitoring and alerting service may utilize a combination of different IoT devices to perform the monitoring function, even though each such IoT device in the combination of IoT devices may be of a different type and/or include a different set of sensors. The monitoring and alerting service may be capable of utilizing different types of sensor data (e.g., video data, audio data, temperature data, infrared data, etc.) to monitor for the same event.

The monitoring and alerting service may enable alerts to be generated in a variety of ways across a variety of different user devices and/or IoT devices. The manner in which an alert is generated may be determined by a user and/or by the monitoring and alerting service. For example, the monitoring and alerting service may determine a context of a user at the time of alert generation, select one or more devices from among a plurality of devices capable of generating the alert based on the context of the user, and generate the alert via the selected one or more devices.

These and various other features and advantages of an IoT device-based monitoring and alerting service in accordance with various embodiments will be described in detail herein. Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. Communication device 114 may include, for example, a cable modem or satellite TV transceiver. Media device 106 may communicate with communication device 114 over a link 116, wherein link 116 may include wireless (such as Wi-Fi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106 and/or display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106 and/or display device 108 using cellular, Bluetooth, infrared, etc., or any combination thereof. Remote control 110 may include a microphone 112, which is further described below.

Multimedia environment 102 may include a plurality of content servers 120 (also called content providers, channels or sources 120). Although only one content server 120 is shown in FIG. 1, in practice multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to content 122. Metadata 124 may also or alternatively include one or more indexes of content 122, such as but not limited to a trick mode index.

Multimedia environment 102 may include one or more system servers 126. System servers 126 may operate to support media devices 106 from the cloud. It is noted that the structural and functional aspects of system servers 126 may wholly or partially exist in the same or different ones of system servers 126.

Media devices 106 may exist in thousands or millions of media systems 104. Accordingly, media devices 106 may lend themselves to crowdsourcing embodiments and, thus, system servers 126 may include one or more crowdsource servers 128.

For example, using information received from media devices 106 in the thousands and millions of media systems 104, crowdsource server(s) 128 may identify similarities and overlaps between closed captioning requests issued by different users 132 watching a particular movie. Based on such information, crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, crowdsource server(s) 128 may operate to cause closed captioning to be automatically turned on and/or off during future streamings of the movie.

System servers 126 may also include an audio command processing module 130. As noted above, remote control 110 may include microphone 112. Microphone 112 may receive audio data from users 132 (as well as other sources, such as the display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which is then forwarded to audio command processing module 130 in system servers 126. Audio command processing module 130 may operate to process and analyze the received audio data to recognize user 132's verbal command. Audio command processing module 130 may then forward the verbal command back to media device 106 for processing.

Figure 2:
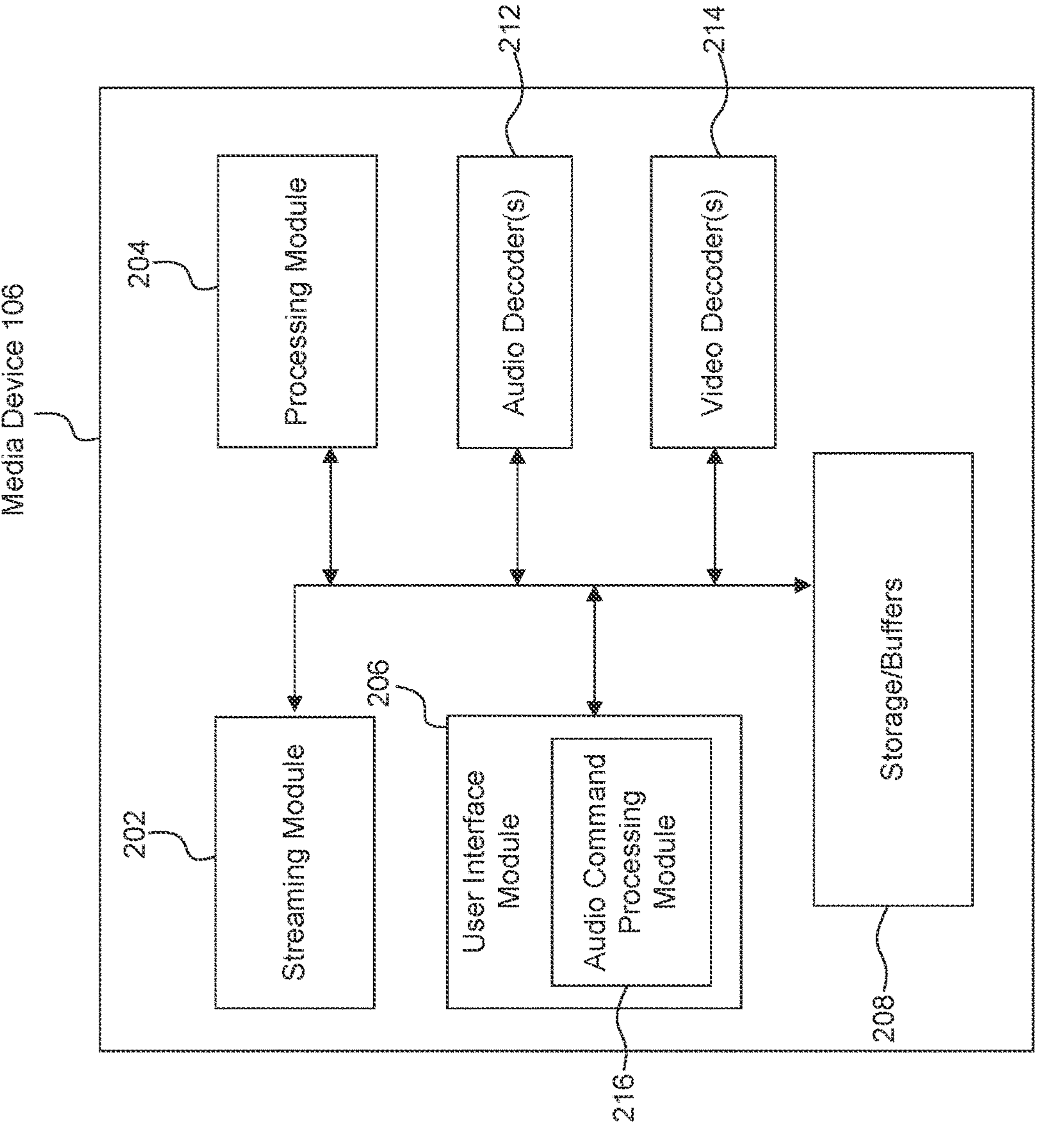
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 130 in system servers 126, or the verbal command recognized by audio command processing module 216 in media device 106).

FIG. 2 illustrates a block diagram of an example media device 106, according to some embodiments. Media device 106 may include a streaming module 202, a processing module 204, storage/buffers 208, and a user interface module 206. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmy, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 via, for example, remote control 110. For example, user 132 may use remote control 110 to interact with user interface module 206 of media device 106 to select content, such as a movie, TV show, music, book, application, game, etc. Streaming module 202 of media device 106 may request the selected content from content server(s) 120 over network 118. Content server(s) 120 may transmit the requested content to streaming module 202. Media device 106 may transmit the received content to display device 108 for playback to user 132.

In streaming embodiments, streaming module 202 may transmit the content to display device 108 in real time or near real time as it receives such content from content server(s) 120. In non-streaming embodiments, media device 106 may store the content received from content server(s) 120 in storage/buffers 208 for later playback on display device 108.

IoT Device-Based Monitoring and Alerting Service

Figure 3:
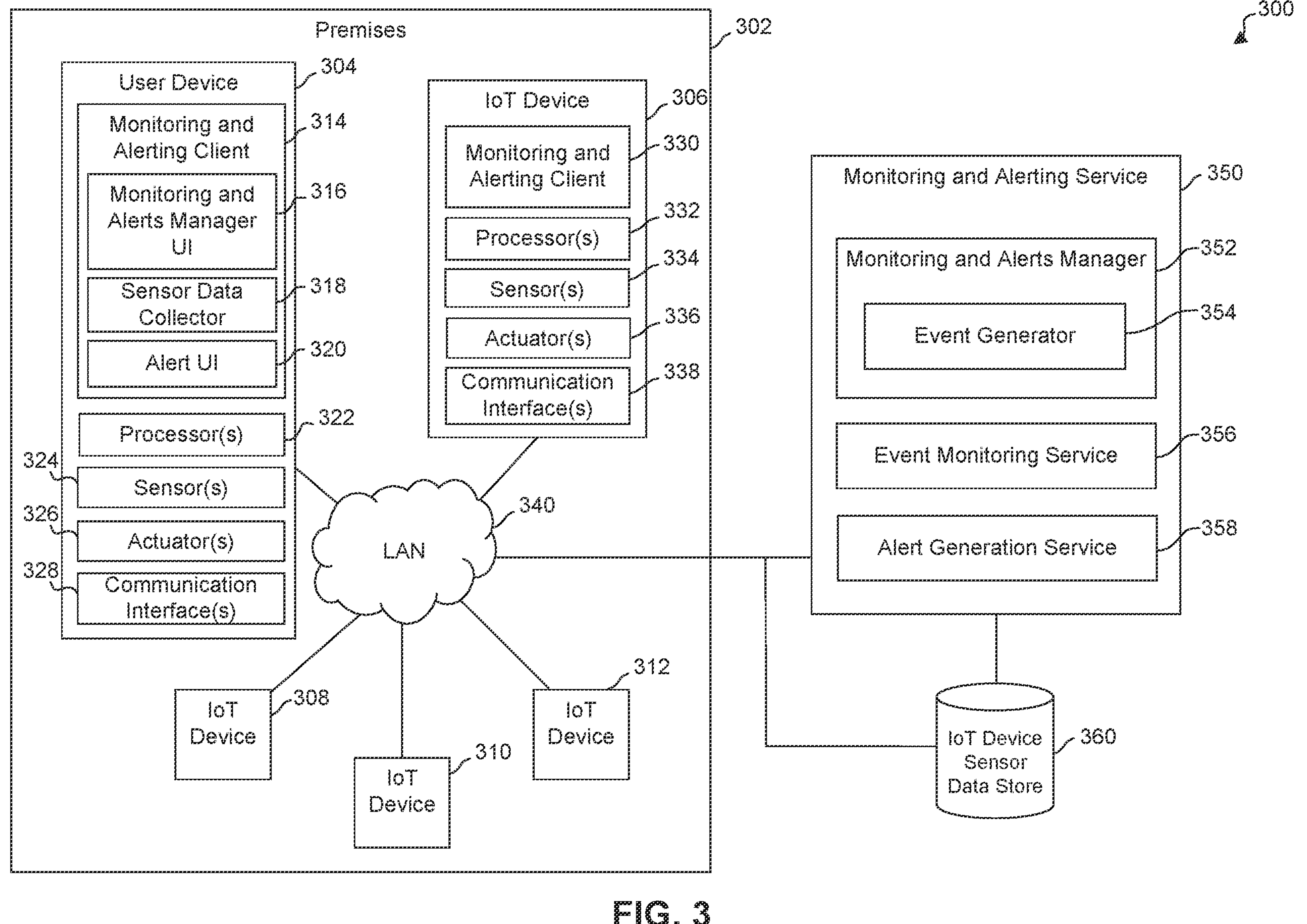
FIG. 3 illustrates a block diagram of a system for providing a monitoring and alerting service for a premises comprising a set of IoT devices.

FIG. 3 illustrates a block diagram of a system 300 for providing a monitoring and alerting service for a premises comprising a set of IoT devices, according to some embodiments. As shown in FIG. 3, system 300 includes a premises 302 and a monitoring and alerting service 350. Each of these aspects of system 300 will now be described.

Premises 302

As shown in FIG. 3, system 300 includes a premises 302 in which a plurality of IoT devices 306, 308, 310 and 312 are present. Premises 302 may comprise, for example and without limitation, a home, an office, a building, a factory, a warehouse, a bar, a restaurant, a movie theater, a stadium, an auditorium, a car, a bus, a boat, or any other structure, location or space in which IoT devices may be present. Although only four IoT devices are shown as being present in premises 302 for the sake of illustration, it should be understood that premises 302 may include any number of IoT devices, including tens, hundreds or even thousands of IoT devices.

As used herein, the term "IoT device" is intended to broadly encompass any device that is capable of engaging in digital communication with another device. For example, a device that can digitally communicate with another device can comprise an IoT device, as that term is used herein, even if such communication does not occur over the Internet.

Each of IoT devices 306, 308, 310 and 312 may comprise a device such as, for example, a smart phone, a laptop computer, a notebook computer, a tablet computer, a netbook, a desktop computer, a video game console, a set-top box, or an OTT streaming media player. Furthermore, each of IoT devices 306, 308, 310 and 312 may comprise a so-called "smart home" device such as, for example, a smart lightbulb, a smart switch, a smart refrigerator, a smart washing machine, a smart dryer, a smart coffeemaker, a smart alarm clock, a smart smoke alarm, a smart carbon monoxide detector, a smart security sensor, a smart doorbell camera, a smart indoor or outdoor camera, a smart door lock, a smart thermostat, a smart plug, a smart television, a smart speaker, a smart remote controller, or a voice controller. Still further, each of IoT devices 306, 308, 310 and 312 may comprise a wearable device such as a watch, a fitness tracker, a health monitor, a smart pacemaker, or an extended reality headset. However, these are only examples and are not intended to be limiting.

IoT devices 306, 308, 310 and 312 may be communicatively connected to a local area network (LAN) 340 via a suitable wired and/or wireless connection. LAN 340 may be implemented using a hub-and-spoke or star topology. For example, in accordance with such an implementation, each of IoT devices 306, 308, 310 and 312 may be connected to a router via a corresponding Ethernet cable, wireless access point (AP), or IoT device hub. The router may include a modem that enables the router to act as an interface between entities connected to LAN 340 and an external wide area network (WAN), such as the Internet. Alternatively, LAN 340 may be implemented using a full or partial mesh network topology. In accordance with a full mesh network topology, each IoT device in the set of IoT devices in premises 302 may be directly connected to each of the other IoT devices in the premises such that it can communicate therewith without a router. In accordance with a partial mesh network technology, only some of the IoT devices in premises 302 may be directly connected to other ones of the IoT devices, and indirect communication between unconnected IoT device pairs may be carried out through one or more intervening devices. A mesh network implementation of LAN 340 may likewise be connected to an external WAN, such as the Internet, via a router. However, these are examples only, and other techniques for implementing LAN 340 may be used.

As further shown in FIG. 3, IoT device 306 may comprise one or more processors 332, one or more sensors 334, one or more actuators 336, and one or more communication interfaces 338. Processor(s) 332 may comprise one or more central processing units (CPUs), microcontrollers, microprocessors, signal processors, ASICs (application specific integrated circuits), and/or other physical hardware processor circuits for performing tasks such as program execution, signal coding, data processing, input/output processing, power control, and/or other functions.

Sensor(s) 334 may comprise one or more devices or systems for detecting and responding to (e.g., measuring, recording) objects and events in the physical environment of IoT device 306. By way of example only and without limitation, sensor(s) 334 may include one or more of a camera or other optical sensor, a microphone or other audio sensor, a radar system, a LiDAR system, a Wi-Fi sensing system, a Global Positioning System (GPS) sensor, a temperature sensor, a pressure sensor, a proximity sensor, an accelerometer, a gyroscope, a magnetometer, an infrared sensor, a gas sensor, or a smoke sensor.

Actuator(s) 336 may comprise one or more devices or systems that are operable to effect a change in the physical environment of IoT device 306. By way of example only and without limitation, actuator(s) 336 may comprise a component that connects a device to a power source, disconnects a device from a power source, switches a light on or off, adjusts a brightness or a color of a light, turns an audible alarm on or off, adjusts the volume of an audible alarm, initiates a call to a security service, turns a heating or cooling system on or off, adjusts a target temperature associated with a heating or cooling system, locks or unlocks a door, rings a doorbell, initiates capture of video or audio, changes a channel or configuration of a television, adjusts the volume of an audio output device, or the like.

Communication interface(s) 338 may comprise components suitable for enabling IoT device 306 to wirelessly communicate with other devices via a corresponding wireless protocol. Communication interface(s) 338 may include, for example and without limitation, one or more of: a Wi-Fi interface that enables IoT device 306 to wirelessly communicate with an access point or other remote Wi-Fi-capable device according to one or more of the wireless network protocols based on the IEEE (Institute of Electrical and Electronics Engineers) 802.11 family of standards, a cellular interface that enables IoT device 306 to wirelessly communicate with remote devices via one or more cellular networks, a Bluetooth interface that enables IoT device 306 to engage in short-range wireless communication with other Bluetooth-enabled devices, or a Zigbee interface that enables IoT device 306 to wirelessly communicate with other Zigbee-enabled devices.

Communication interface(s) 338 may additionally or alternatively comprise components suitable for enabling IoT device 306 to communicate over a wired connection with other devices via a corresponding wired protocol, such as a Universal Serial Bus (USB) connection and protocol or Ethernet connection and protocol.

As further shown in FIG. 3, IoT device 306 may include a monitoring and alerting client 330. The features of monitoring and alerting client 330 will be described below in reference to monitoring and alerting client 314 of user device 304. Monitoring and alerting client 330 may be implemented as processing logic that can comprise hardware (e.g., circuitry, dedicated logic, programmable logic, microcode, etc.), software (e.g., instructions executing on a processing device), or a combination thereof. Monitoring and alerting client 330 may comprise a software application that is executed by processor(s) 332 of IoT device 306.

Each of IoT devices 308, 310 and 312 may include similar components to those shown with respect to IoT device 306. Thus, for example, each of IoT device 308, 310 and 312 may include one or more processors, one or more sensors, one or more actuators, one or more communication interfaces, and a monitoring and alerting client.

User device 304 is intended to represent a personal computing device or media device associated with a user. For example, in an embodiment in which multimedia environment is present in premises 302, user device 304 may comprise media device 106, and a user interface of user device 304 may be presented to a user via display device 108. User device 304 may also comprise a smart phone, a laptop computer, a notebook computer, a tablet computer, a netbook, a desktop computer, a video game console, or a wearable device (e.g., a smart watch or extended reality headset). User device 304 may include one or more processors 322, one or more sensor(s) 324, one or more actuators 326, one or more communication interfaces 328, and a monitoring and alerting client 314.

Processor(s) 322 may comprise one or more CPUs, microcontrollers, microprocessors, signal processors, ASICs, and/or other physical hardware processor circuits for performing tasks such as program execution, signal coding, data processing, input/output processing, power control, and/or other functions.

Sensor(s) 324 may comprise one or more devices or systems for detecting and responding to (e.g., measuring, recording) objects and events in the physical environment of user device 304. Sensor(s) 324 may include, for example, one or more of the sensor types previously described in reference to sensor(s) 334 of IoT device 306.

Actuator(s) 326 may comprise one or more devices or systems that are operable to effect a change in the physical environment of user device 304. Actuator(s) 326 may comprise, for example, one or more of the actuator types previously described in reference to actuator(s) 336 of IoT device 306.

Communication interface(s) 328 may comprise components suitable for enabling user device 304 to communicate with other devices via a wired or wireless communication medium using a corresponding wired or wireless communication protocol. Communication interface(s) 328 may comprise, for example, one or more of the communication interface types previously described in reference to communication interface(s) 338 of IoT device 306.

Monitoring and alerting client 314 may be configured to interact with monitoring and alerting service 350 to enable IoT device-based monitoring and alerting services to be provided for premises 302. Monitoring and alerting client 314 may be implemented as processing logic that can comprise hardware (e.g., circuitry, dedicated logic, programmable logic, microcode, etc.), software (e.g., instructions executing on a processing device), or a combination thereof. Monitoring and alerting client 314 may comprise a software application that is executed by processor(s) 322 of user device 304. As shown in FIG. 3, monitoring and alerting client 314 may include a monitoring and alerts manager user interface (UI) 316, a sensor data collector 318, and an alert UI 320.

Monitoring and alerts manager UI 316 may comprise a UI that enables a user to interact with a monitoring and alerts manager 352 (described in more detail herein) of monitoring and alerting service 350 to specify one or more events to be monitored for by monitoring and alerting service 350 utilizing one or more of IoT devices 306, 308, 310 and 312. Monitoring and alerts manager UI 316 may also enable a user to interact with monitoring and alerts manager 352 to specify how alerts should be issued by event monitoring and alerting service 350. Depending upon the implementation, monitoring and alerts manager UI 316 may comprise a graphical UI (GUI), a menu-driven UI, a touch UI, a voice UI, a form-based UI, a natural language UI, or the like.

Sensor data collector 318 may be configured to collect sensor data from sensor(s) 324 of user device 304 and provide such sensor data to monitoring and alerting service 350 for use thereby in monitoring for one or more events. For example, sensor data collector 318 may continuously, periodically or intermittently collect sensor data from sensor(s) 324 and provide such sensor data to monitoring and alerting service 350 to enable event monitoring thereby. Sensor data collector 318 may provide the sensor data to monitoring and alerting service 350 by storing the sensor data in an IoT device sensor data store 360 that is accessible to both user device 304 and monitoring and alerting service 350.

Alert UI 320 may be configured to generate an alert responsive to a communication from monitoring and alerting service 350. Such communication may be generated by monitoring and alerting service 350, for example, when an event is detected thereby. The type(s) of alerts that may be generated by alert UI 320 may depend upon a type and/or feature set of user device 304 upon which alert UI 320 is installed. For example, alerts may be audible (e.g., generated using one or more speakers), visual (e.g., generated using one or more lights or by rendering text, an image or video to a display), haptic (e.g., generated using a vibration motor or other haptic actuator), or the like.

Monitoring and alerting client 330 of IoT device 306 may include components similar to those of monitoring and alerting client 314. Thus, monitoring and alerting client 330 may include one or more of (i) a monitoring and alerts manager UI that enables a user to interact with monitoring and alerts manager 352 of monitoring and alerting service 350 to specify one or more events to be monitored for and/or to specify how alerts should be issued, (ii) a sensor data collector that collects sensor data from sensor(s) 334 of IoT device 306 and provides such sensor data to monitoring and alerting service 350 for use thereby in monitoring for one or more events (e.g., by storing such sensor data in IoT device sensor data store 360), and (iii) an alert UI that may generate an alert responsive to a communication from monitoring and alerting service 350. As was previously noted, each of IoT devices 308, 310 and 312 may also include a monitoring and alerting client and such client may include similar components to, and perform operations similar to those performed by, monitoring and alerting client 314 and monitoring and alerting client 330.

Although only a single user device 304 is shown in FIG. 3, it is to be understood that multiple user devices may be present in premises 302, and each such user device may be configured in a like manner to user device 304.

Additionally, although only a single premises 302, with associated user device 304 and set of IoT devices 306, 308, 310 and 312, is shown in FIG. 3 for the sake of simplicity, it is to be understood that system 300 may include any number of premises (including hundreds, thousands, tens of thousands, hundreds of thousands, millions, or hundreds of millions of premises), each with its own user device(s) and IoT devices, and that monitoring and alerting service 350 may be used to provide IoT device-based monitoring and alerting services to each such premises utilizing the IoT devices respectively deployed therein.

Monitoring and Alerting Service 350

As further shown in FIG. 3, system 300 includes monitoring and alerting service 350. Monitoring and alerting service 350 may be implemented as processing logic that can comprise hardware (e.g., circuitry, dedicated logic, programmable logic, microcode, etc.), software (e.g., instructions executing on a processing device), or a combination thereof. Monitoring and alerting service 350 may be implemented by one or more devices (e.g., one or more servers) that are remote from premises 302 but communicatively connected thereto (e.g., communicatively connected to LAN 340) via one or more networks. Alternatively, monitoring and alerting service 350 may be implemented by a device within premises 302, such as by user device 304, or one of IoT devices 306, 308, 310 and 312. Still further, monitoring and alerting service 350 may be implemented in a distributed manner by two or more remotely located and/or local devices.

Monitoring and alerting service 350 may comprise a monitoring and alerts manager 352. Monitoring and alerts manager 352 may enable a user (e.g., a user associated with premises 302) to specify one or more events to be monitored for by monitoring and alerting service 350 utilizing at least one or more of IoT devices 306, 308, 310, and 312. For example, a user may interact with monitoring and alerts manager 352 via monitoring and alerts manager UI 316 to specify one or more events to be monitored for by monitoring and alerting service 350 utilizing at least one or more of IoT devices 306, 308, 310, and 312.

Figure 4:
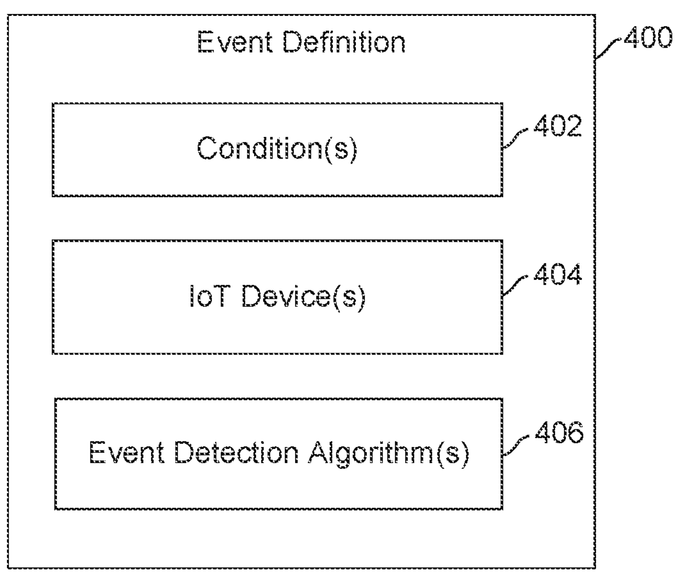
FIG. 4 illustrates a block diagram of an event definition that defines an event that may be monitored for by a monitoring and alerting service, according to some embodiments.

An event may be any set of conditions and/or phenomena that may be monitored for using at least one or more IoT devices in a premises (e.g., one or more of IoT devices 306, 308, 310 and 312 in premises 302). FIG. 4 illustrates a block diagram of an example event definition 400 that defines an event that may be monitored for by monitoring and alerting service 350, according to some embodiments. Event definition 400 is presented herein by way of example only, and is not intended to be limiting. Persons skilled in the relevant art(s) will appreciate that an event may be defined in other ways than that depicted in FIG. 4. As shown in FIG. 4, event definition 400 comprises one or more conditions 402, one or more IoT devices 404, and one or more event detection algorithms 406.

Condition(s) 402 may represent a set of factors or circumstances that must exist for the event defined by event definition 400 to be deemed detected or to have occurred. Condition(s) 402 may also be thought of as a set of triggers for the event defined by event definition 400. Condition(s) 402 may be monitored for using at least one or more IoT devices in a premises (e.g., one or more of IoT devices 306, 308, 310 and 312 in premises 302). Condition(s) 402 may include, for example and without limitation, one or more of: a state of an object or person (e.g., garage door is open, baby is sleeping, smoke alarm is beeping), a presence or non-presence of an object or person (e.g., package on doorstep, water in basement, user is home, user is not home, car is not in garage, boat is not at dock), or an existence or non-existence of a phenomenon (e.g., temperature is above or below a certain threshold, light is or is not coming through a window, smoke is detected or not detected, carbon dioxide is detected or not detected, a certain sound is audible or inaudible).

Condition(s) 402 may be temporal in nature. For example and without limitation, condition(s) 402 may include temporal factors or circumstance such as user is sleeping past a certain time, person detected on property at night, lights are on during daylight hours, garbage not put out at customary time, person in house while homeowner is on vacation, etc. Temporal conditions may entail phenomenon occurring within or outside of prescribed time windows, different phenomena occurring concurrently or within a particular time window, or phenomenon following or deviating from temporal patterns. Still other types of temporal condition(s) may be included within condition(s) 402.

Condition(s) 402 may also include one or more factors or circumstances that may be determined based on data obtained from one or more data sources that are external to premises 302. For example, condition(s) 402 may include one or more factors or circumstances that may be determined based on data obtained from the world wide web or a third-party service. Examples of such externally-obtained data may include, but are by no means limited to, an indication of inclement weather published by a weather service, an incident logged by a remote home security service, an alert published by a governmental entity such as a law enforcement entity or a public health entity, a status of a person as indicated by a social networking service, an indication of product availability provided by an online shopping service, an indication of content availability provided by a streaming media service, or the like.

IoT device(s) 404 may represent a set of IoT devices that can be used to monitor for one or more of condition(s) 402. IoT device(s) 404 may be specified in generic terms (e.g., a smart doorbell) or in specific terms (e.g., a particular manufacturer and model of smart doorbell).

Event detection algorithm(s) 406 may represent a set of algorithms that can be used to determine whether one or more of condition(s) 402 exists. For example, event detection algorithm(s) 406 may include a trained machine learning (ML) model that processes audio captured by an IoT device to determine if the sound of a smoke alarm is detected, or a trained ML model that processes video or images captured by an IoT device to detect if a package is on a doorstep or if a person is in a room.

Monitoring and alerts manager 352 may enable a user to select an event for monitoring from among a set of predefined events, wherein each predefined event is represented by a corresponding event definition 400. For example, monitoring and alerts manager 352 may present a set of predefined events to a user via monitoring and alerts manager UI 316 and the user may select one or more of the predefined events from the set to initiate monitoring thereof. As another example, a user may provide natural language input (e.g., either spoken or typed) via monitoring and alerts manager UI 316, and monitoring and alerts manager 352 may utilize a large language model (LLM) or other suitable model/algorithm to interpret such natural language input to determine that the user has requested monitoring of one or more events within a set of predefined events.

Predefined events may include, for example, a set of default event types provided by monitoring and alerting service 350. Predefined events may also comprise events defined by or on behalf of other users or for other premises, which are then shared with multiple users for use in multiple premises. Monitoring and alerting service 350 may recommend an event defined for one user/premises for use by another user/premises based on any number of factors including but not limited to having similar IoT devices, similar premises layouts, similar geolocation, similar demographics, or the like.

Monitoring and alerts manager 352 may comprise an event generator 354. Event generator 354 may operate to generate new events that are eligible for monitoring based on user input and/or sensor data collected from IoT device(s) associated with a user.

For example, event generator 354 may receive user input and analyze such user input to define a new event whose occurrence can be monitored for by monitoring and alerting service 350. Such user input may be provided, for example, via monitoring and alerts manager UI 316. For example, monitoring and alerts manager UI may include a GUI that enables a user to define a new event. Such GUI may enable the user to define the new event in accordance with event definition 400 by specifying one or more of condition(s) 402 that will trigger the event, IoT device(s) 404 that will be used to monitor for one or more of condition(s) 402, and/or event detection algorithm(s) 406 that will be used to determine if one or more of condition(s) 402 has occurred.

In accordance with an implementation in which monitoring and alerts manager UI 316 comprises a natural language UI, a user may provide natural language input (e.g., either spoken or typed) via monitoring and alerts manager UI 316, and event generator 354 may utilize an LLM or other suitable model/algorithm to interpret such input to generate a definition (e.g., event definition 400) of a new event to be monitored for by monitoring and alerting service 350.

For example, a user may state or type "alert me when the deer are eating my flowers." Based on this natural language input, event generator 354 may generate an event definition 400 that includes a condition 402 "the deer are eating my flowers", an IoT device 404 comprising a smart security camera having a field of view that includes the aforementioned flowers, and an event detection algorithm 406 comprising a model for detecting deer based on video collected from the smart security camera. This is merely one example, however, and numerous other event definitions may be generated based on different user input.

Event generator 354 may also analyze sensor data collected from a user's IoT devices to define a new event whose occurrence can be monitored for by monitoring and alerting service 350. For example, sensor data that is collected from one or more of IoT devices 306, 308, 310 and 312 and stored in IoT device sensor data store 360 may be analyzed by event generator 354 to define a new event whose occurrence can be monitored for by monitoring and alerting service 350.

For example, event generator 354 may analyze the sensor data to detect an anomalous set of conditions and define the new event based at least on the anomalous set of conditions. An anomalous condition may include a condition that deviates from an established norm or pattern. For example, if the sensor data indicates that garbage cans are typically placed at the end of the driveway on Tuesday nights, then an anomalous condition may be the garbage cans not being at the end of the driveway on a Tuesday night. Consequently, event generator 354 may define a new event conditioned on the garbage cans not being at the end of the driveway on a Tuesday night and monitoring and alerts manager 352 may prompt the user to ask if he/she wishes to activate monitoring for such an event. As another example, if the sensor data indicates that a particular window is typically closed when it is raining, then an anomalous condition may be the window being open when it is raining. Consequently, event generator 354 may define a new event conditioned on the window being open when it is raining and monitoring and alerts manager 352 may prompt the user to ask if he/she wished to activate monitoring for such an event.

As another example, event generator 354 may analyze the sensor data to detect a set of conditions that are associated with a standard event type and define the new event based at least on the set of conditions associated with the standard event type. A standard event type may be a type of event about which some, many or most users would wish to be alerted, regardless of whether such event is anomalous. Standard event types may include, for example and without limitation, events like person or package at a front door, doorbell ringing, garage door opening, or the like. Event generator 354 may apply a trained ML model to the sensor data to detect a set of conditions associated with a standard event type. After event generator 354 defines a new event based at least on the set of conditions associated with the standard event type, monitoring and alerts manager 352 may prompt the user to ask if he/she wishes to activate monitoring for the new event.

As part of defining a new event, event generator 354 may define a set of event detection algorithms 406 for detecting one or more conditions in a set of conditions 402 associated with the new event. As noted above, the set of event detection algorithm(s) 406 may include a trained ML model that is configured to detect a particular condition (e.g., a trained ML model that is configured to detect a deer based on video data). Such trained ML model may be obtained in a variety of ways.

In one example scenario, the trained ML model may comprise an ML model that is already available and has been previously trained using publicly available data or privately generated or curated data.

In another example scenario, event generator 354 may search for training data in real time and then utilize such training data to generate the trained ML model for use in monitoring for the new event. For example, event generator 354 may search among a variety of public and/or private online data sources to obtain a suitable training dataset to generate the trained ML model.

In yet another example scenario, event generator 354 may utilize sensor data collected from the user's own IoT devices (e.g., one or more of IoT devices 306, 308, 310 and 312) to train the ML model. For example, if the trained ML model is to be used for detecting a deer based on video data, event generator 354 may search video data previously collected by a user's smart security camera to identify footage that appears to contain a deer (e.g., using an ML model trained on publicly-available data) and then utilize such footage as training data for training the ML model. In further accordance with such a scenario, event generator 354 may first present the footage to the user for confirmation thereby that what is being shown is in fact a deer (or otherwise represents a condition associated with the new event) before using the footage as training data for the ML model.

Alternatively or additionally, event generator 354 may request that the user submit training data for the ML model. For example, event generator 354 may request that the user utilize a camera or microphone of user device 304 to submit an image, video, or audio sample that can be used to train the ML model.

In some scenarios, event generator 354 may initially assign an ML model to a new event and then retrain the ML model over time based on sensor data collected from a user's own IoT devices to improve the performance of the ML model. For example, when monitoring and alerting service 350 detects that a new event has occurred and generates a corresponding alert, a user of monitoring and alerting service 350 may be prompted to indicate whether the service has correctly or incorrectly detected the new event. The user's response can be used to label the sensor data that triggered the alert, and such labelled sensor data may comprise new training data that can be used to retrain the ML model.

As discussed above, event generator 354 may define a new event based on an analysis of sensor data collected from a set of IoT devices of a premises (e.g., one or more of IoT devices 306, 308, 310 and 312 of premises 302). In further implementations, event generator 354 may define a new event based also on sensor data collected from one or more other sets of IoT devices of one or more other premises, respectively. Thus, for example, event generator 354 may analyze sensor data collected from multiple premises to define new events and such new events may be made available for monitoring across multiple premises.

As also discussed above, event generator 354 may assign a trained ML model to an event, wherein the trained ML model may be trained using sensor data collected from a set of IoT devices of a premises (e.g., one or more of IoT devices 306, 308, 310 and 312 of premises 302). In further implementations, the ML model may be trained also using sensor data collected from one or more other sets of IoT devices of one or more other premises, respectively. Thus, for example, sensor data collected from IoT devices from multiple different premises may be used to train the ML model.

When setting up an event (e.g., a predefined event or new event) for monitoring, monitoring and alerts manager 352 may enable a user to specify which IoT device(s) in a premises (e.g., which of IoT devices 306, 308, 310 or 312 in premises 302) should be used to perform the monitoring task. In a scenario in which monitoring and alerting service 350 is able to access information about a set of IoT devices associated with the user (e.g., the set of IoT devices 306. 308, 310 and 312 of premises 302), monitoring and alerts manager 352 may assign specific ones of those IoT devices to the event, or recommend specific ones of those IoT devices for assignment to the event. The determination of which IoT device(s) should be used to monitor for which condition(s) may be made by monitoring and alerts manager 352 based on a variety of factors including but not limited to the nature of the condition(s) being monitored for and the type, location, and/or capabilities the of IoT devices present within premises 302. Monitoring and alerts manager 352 may also specify or recommend how such IoT device(s) should be located, positioned and/or oriented to monitor (or best monitor) for the event.

In a scenario in which the set of IoT devices associated with an event is not defined based on a user's own IoT devices, setting up monitoring for the event may entail determining whether the user possesses the necessary IoT devices for monitoring the event. For example, in a scenario in which the event is defined by event definition 400, monitoring and alerts manager 352 may compare the user's IoT devices to IoT device(s) 404 to determine if the user possesses the necessary IoT devices to monitor for condition(s) 402.

If multiple ones of a user's IoT devices are capable of monitoring for an event, monitoring and alerts manager 352 may present the user with a list of all such IoT devices and allow the user to select which of the IoT devices will be used for monitoring. Monitoring and alerts manager 352 may guide the user in making this selection by indicating which IoT devices should be utilized to obtain the best monitoring performance.

In a case in which the user does not possess the necessary IoT devices, monitoring and alerts manager 352 may notify the user about which IoT device(s) they would need to obtain to conduct monitoring for the event and optionally provide the user with a means for obtaining (e.g., purchasing) the missing IoT device(s). For example, monitoring and alerts manager 352 may enable the user to conduct an online purchase of the missing IoT device(s) via monitoring and alerts manager UI 316.

Different IoT devices or combinations of IoT devices may provide different levels of monitoring quality. In some implementations, monitoring and alerts manager 352 may determine that a user possesses a sufficient (e.g., minimal) set of IoT devices necessary to monitor for an event but that the monitoring quality could be improved if the user upgraded an IoT device or purchased an additional IoT device. For example, detecting the presence of a person in a room may be performed using only an IoT device that captures audio input, but adding an IoT device that also captures video input may significantly improve detection accuracy and precision. In further accordance with such an implementation, monitoring and alerts manager 352 may indicate to a user which of their IoT devices should be upgraded and/or which IoT devices should be added in order to obtain improved monitoring quality. Monitoring and alerts manager may further provide the user with a means for obtaining (e.g., purchasing) the upgraded and/or additional IoT device(s). For example, monitoring and alerts manager 352 may enable the user to conduct an online purchase of the upgraded or additional IoT device(s) via monitoring and alerts manager UI 316.

Monitoring and alerting service 350 may further comprise an event monitoring service 356. Event monitoring service 356 may operate to monitor for an occurrence of an event for which monitoring has been activated by monitoring and alerting service 350 (e.g., either automatically or based on user input as described above). For example, event monitoring service 356 may monitor for an occurrence of an event defined in accordance with event definition 400. In further accordance with such an example, event monitoring service 356 may utilize sensor data collected from one or more IoT devices of a premises (e.g., one or more of IoT devices 306, 308, 310 or 312 of premises 302) to monitor for one or more condition(s) 402 that indicate that the event has occurred. Event monitoring service 356 may determine which IoT devices to use for monitoring based on set of IoT devices 404 associated with event definition 400. Furthermore, event monitoring service 356 may utilize set of event detection algorithms 406 (e.g., one or more trained ML models) to detect whether one or more of condition(s) 402 has been satisfied.

Event monitoring service 356 may detect the occurrence of an event in real time or near real time based on sensor data that is collected from the IoT devices of the premises. As noted above, each IoT device may include a sensor data collector that is configured to provide sensor data to event monitoring service 356 on a continuous, periodic or intermittent basis. In a scenario in which sensor data previously collected from the IoT devices is stored or archived for some period of time (e.g., in IoT device sensor data store 360), event monitoring service 356 may detect a past occurrence of an event based on the stored sensor data and notify a user thereof. For example, when an event is first activated for monitoring by a user, monitoring and alerting service 350 may provide the user with an option of determining whether the event has occurred in the past. If the user exercises such option, event monitoring service 356 may utilized the aforementioned stored or archived sensor data to determine whether the event has occurred in the past and the user may be notified of any detected past occurrences of the event.

Monitoring and alerting service 350 may further comprise an alert generation service 358. Alert generation service 358 may cause an alert to be generated in response to the detection of an event by event monitoring service 356. For example, in response to the detection of an event by event monitoring service 356, alert generation service 358 may communicate with one or more devices (e.g., one or more of user device 304 or IoT devices 306, 308, 310, 312) to cause such device(s) to generate an alert via a suitable UI (e.g., alert UI 320).

Any of a wide variety of alert generating mechanisms may be used. As noted above, alerts may be audible (e.g., generated using one or more speakers), visual (e.g., generated using one or more lights or by rendering text, an image or video to a display), haptic (e.g., generated using a vibration motor or other haptic actuator), or the like. Alerts may comprise text messages, email messages, push notifications, or any other type of message or notification that may be transmitted to a device and perceived by a user. Alerts may be directed to users associated with a premises (e.g., homeowners, home occupants, business owners, office occupants) and/or to other entities such as emergency services (e.g., 911 services), home security companies, police departments, fire departments, or the like.

A user may interact with monitoring and alerts manager 352 via monitoring and alerts manager UI 316 to specify how alerts should be generated for particular events, groups of events or all events. A user may, for example, specify a preferred mode or channel for receiving alerts (e.g., an audible alarm generated by an IoT device within a premises vs. push notifications to a smart phone). A user may also specify multiple different modes or channels for receiving the same alert.

In certain implementations, a user can provide verbal or text (e.g., natural language) input and an interpreter (e.g., LLM-based interpreter) can be used to (i) define an event (conditions, eligible IoT devices/sensors, event detection algorithm); (ii) define an alert associated with the event; and (iii) activate monitoring for the event and generation of the alert based on a detection of the event.

In accordance with an implementation in which monitoring and alerts manager UI 316 comprises a natural language UI, a user may provide natural language input (e.g., either spoken or typed) via monitoring and alerts manager UI 316, and such natural language input may be interpreted to determine how an alert should be generated. Thus, for example, a user may state or type "send me a text message when the deer are eating my flowers" and monitoring and alerts manager 352 may thus determine that a text message should be sent to the user's smart phone when the event of a deer eating the flowers is detected.

Alert generation service 358 may determine the manner in which to generate an alert automatically (e.g., without user input). For instance, alert generation service 358 may determine a context of a user at a time when an alert is to be generated and then determine the manner in which to generate the alert based on the context of the user. Alert generation service 358 may determine the manner in which to generate the alert based on the context of the user by selecting one or more devices from among a plurality of devices capable of generating the alert (e.g., user device 304 and IoT devices 306, 308, 310, 312) based on the context of the user, and generate the alert via the selected one or more devices.

In further accordance with this example, alert generation service 358 may determine a location of a user at a time an alert is to be generated (e.g., based on GPS sensor data collected from user device 304 or on video and/or audio data collected from one or more of IoT devices 306, 308, 310 or 312) and select which device(s) will generate the alert based on the user's location. In some implementations, alert generation service 358 may cause the alert to be generated by the IoT device that is determined to be closest to the location of the user in premises 302, or, if the user is determined to be located outside of premises 302, alert generation service 358 may cause the alert to be sent to the user's smart phone or smart watch.

In still further accordance with this example, alert generation service 358 may determine that a user is interacting with a particular device at a time an alert is to be generated and, as a result, select the particular device for generating the alert. For instance, alert generation service 358 may determine that a user proximate to or watching a smart television at the time the alert is to be generated and, as a result, cause the alert to be presented via the smart television. If the event is a person on the doorstep as detected by a smart video camera, alert generation service 358 may generate the alert via the smart television by presenting a video feed from the smart video camera via the display of the smart television. Alternatively, alert generation service 358 may cause a remote control associated with the smart television to generate a doorbell sound when a person is detected on a front doorstep or when a person presses a doorbell button.

As noted above, in some implementations, the alert may comprise a video feed captured by a video camera that is displayed on a device such as a smart television. In further accordance with such an example, alert generation service 358 may translate speech that is captured by a microphone associated with the video camera into text (e.g., using a suitable speech-to-text translation algorithm) and display the text overlaid on the video feed when the video feed is presented to the user.

As demonstrated by the foregoing description, monitoring and alerting service 350 may advantageously utilize IoT devices 306, 308, 310 and 312 installed on premises 302 to monitor for a wide variety of different events.

In certain scenarios, monitoring and alerting service 350 may be configured to extend "smart home" features to an unconnected device within premises 302. For example, monitoring and alerting service 350 may be configured to utilize one or more of IoT devices 306, 308, 310 or 312 to monitor a state of an unconnected device within premises 302 and to generate an alert based on a detected change in state of the unconnected device. Such feature can enable a homeowner to leverage unconnected devices in providing smart home features without having to replace such unconnected devices with connected devices. For example, monitoring and alerting service 350 may be configured to utilize one or more of IoT devices 306, 308, 310 or 312 within premises 302 to detect that an unconnected smoke alarm within premises 302 has been activated and, in response, send a notification to an appropriate authority.

In other scenarios, monitoring and alerting service 350 may be configured to utilize one or more of IoT devices 306, 308, 310 or 312 within premises 302 to monitor a state of a device that is connected to a first service so that, when a change in state of the device is detected, an alert may be generated via a second service that is otherwise unconnected to the first service. For example, monitoring and alerting service 350 may be configured to utilize one or more of IoT devices 306, 308, 310 or 312 within premises 302 to detect that a motion detector or glass break detector that is connected to a remote home monitoring service has been activated and, in response, send an alert to a user via monitoring and alerting service 350, even though monitoring and alerting service 350 is otherwise unconnected to the remote home monitoring service.

In still other scenarios, monitoring and alerting service 350 may be configured to utilize one or more of IoT devices 306, 308, 310 or 312 within premises 302 to monitor a state of a connected or unconnected device within the premises to detect when the device is not operating or is operating in a degraded capacity and to alert a user of the same. For example, monitoring and alerting service 350 may be configured to utilize one or more of IoT devices 306, 308, 310 or 312 within premises 302 to detect that a security alarm was not armed when a user left home or after a certain time in the evening and, in response, send an alert to the user to remind them to arm the security alarm. As another example, monitoring and alerting service 350 may be configured to utilize one or more of IoT devices 306, 308, 310 or 312 within premises 302 to detect when a "replace battery" light on an unconnected smoke detector is flashing and, in response, send an alert to the user that indicates that they should replace the battery in the smoke detector.

As another example, monitoring and alerting service 350 may be configured to determine that one or more of IoT devices 306, 308, 310 or 312 within premises 302 is missing or inoperable, or that there has been a loss of internet service and/or power to some or all of premises 302, and alert a user of the same. In a case of a partial loss of internet service or power, this event may be detected based at least on sensor data collected by one or more IoT devices that are able to remain operable and connected to monitoring and alerting service 350 during the partial outage. In a case in which there is a total loss of internet service and power to premises 302, monitoring and alerting service 350 may determine that a complete outage has occurred based on information collected from the IoT devices before the beginning of the outage and/or based on data obtained from an external data source (e.g., an internet service provider or power company). In an implementation in which monitoring and alerting service 350 is implemented on one or more remote servers (e.g., in the cloud), monitoring and alerting service 350 can advantageously generate alerts and perform other actions on behalf of a user even when there is a complete loss of internet and/or power to premises 302.

In further scenarios, monitoring and alerting service 350 may be configured to utilize one or more of IoT devices 306, 308, 310 or 312 to amplify an alert generated by another device within premises 302 to help increase a likelihood that the alert is observed by an appropriate user or entity. For example, monitoring and alerting service 350 may be configured to utilize one or more of IoT devices 306, 308, 310 or 312 within premises 302 to detect that a refrigerator door has been left open, and a refrigerator door alarm has been correspondingly activated, and to alert a user of the same (e.g., via a push notification to the user's smart watch or phone). This may be helpful in case the user cannot hear the refrigerator door alarm. As another example, monitoring and alerting service 350 may be configured to utilize one or more of IoT devices 306, 308, 310 or 312 within premises 302 to detect that a tea kettle is whistling on a stovetop and to alert a user of the same. This may be helpful in case the user cannot hear the whistling tea kettle.

A number of other example use cases for monitoring and alerting service 350 will now be described by way of illustration only. These examples are not intended to be limiting. Persons skilled in the relevant art(s) will readily appreciate that monitoring and alerting service 350 may be used to monitor for other types of events and/or generate other types of alerts than those described herein.

Monitoring and alerting service 350 may be configured to utilize one or more of IoT devices 306, 308, 310 or 312 within premises 302 to detect that a door (e.g., front door, garage door) or window is open when it shouldn't be open and to alert a user of the same.

Monitoring and alerting service 350 may be configured to utilize one or more of IoT devices 306, 308, 310 or 312 within premises 302 to detect that an oven or stove has been left on for longer than a certain amount of time and to alert a user of the same.

Monitoring and alerting service 350 may be configured to utilize one or more of IoT devices 306, 308, 310 or 312 within premises 302 to detect that a child or other person has entered or fallen into a pool or hot tub and to alert a user of the same.

Monitoring and alerting service 350 may be configured to utilize a camera that is capable of detecting sub-pixel movement to determine if a baby is having trouble breathing or has stopped breathing and to alert a user of the same. Likewise, monitoring and alerting service 350 may be configured to utilize a camera that is capable of detecting sub-pixel movement to determine if a person has an elevated pulse (e.g., from the user's face) and to generate an alert based on the same.

Monitoring and alerting service 350 may be configured to utilize one or more of IoT devices 306, 308, 310 or 312 within premises 302 to monitor a utility meter or water meter and to alert a user to abnormal events based on such monitoring (e.g., to alert a user in sudden usage spikes).

Monitoring and alerting service 350 may be configured to utilize one or more of IoT devices 306, 308, 310 or 312 within premises 302 to monitor for any of the following conditions and to alert a user of the same: fire detected inside or outside premises; particular matter or CO2 detected in premises; water incursion from a broken pipe or weather event; broken yard lights; pool level above a desired threshold (e.g., due to excessive rain); pool level below a desired threshold (e.g., due to evaporation); blocked sprinkler in yard; burst sprinkler or fountain in yard; boat lift left in water; boat missing from dock; damage to objects or structures in or around a home; package left in unexpected location; inclement weather expected and windows open; high winds expected and pool shade up; air low in a tire of a vehicle located on premises; brake light, reverse light or headlight out on a vehicle located on premises; damage to a vehicle located on premises;

Monitoring and alerting service 350 may be configured to initiate monitoring for an event based on a keyword or phrase uttered by a user. For example, a user may specify a keyword or phrase that initiates monitoring or initiates heightened monitoring for certain events. Furthermore, monitoring and alerting service 350 may be configured to recognize the utterance of the keyword or phrase as the event itself. For example, a user may configure monitoring and alerting service 350 to contact an emergency service, home monitoring service, or public authority in the event the user utters a particular keyword or phrase. Such a feature may be particularly useful in cases of a home invasion or hostage situation, when a user wishes to alert an authority without putting a perpetrator on notice.

Monitoring and alerting service 350 may also be configured to temporarily cease monitoring for an event based on a keyword or phrase uttered by a user. For example, a user may specify a keyword or phrase that causes monitoring for an event to be temporarily suspended. In further accordance with this example, the user may specify that when they say the word "test" before pushing a button to activate smoke alarm (e.g., as part of testing to see if the smoke alarm is still working), that monitoring and alerting service 350 will temporarily suspend monitoring for activation of the smoke alarm.

Figure 5:
FIG. 5 illustrates a flow diagram of a method for providing a monitoring and alerting service for a premises comprising a set of IoT devices, according to some embodiments.
Figure 5:
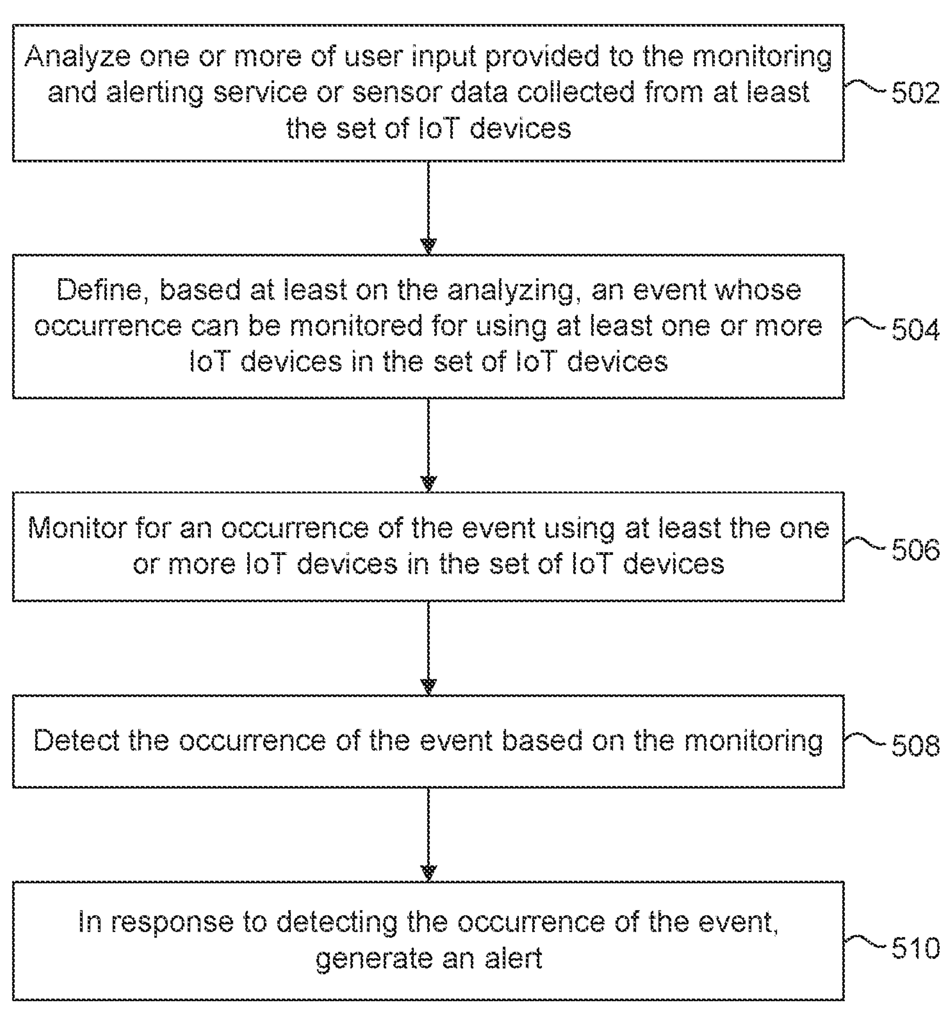

FIG. 5 illustrates a flow diagram of a method 500 for providing a monitoring and alerting service for a premises comprising a set of IoT devices, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIG. 3. However, method 500 is not limited to that example embodiment.

In 502, event generator 354 of monitoring and alerting service 350 analyzes one or more of user input provided to monitoring and alerting service 350 (e.g., via monitoring and alerts manager UI 316) or sensor data collected from at least the set of IoT devices 306, 308, 310 and 312.

Analyzing the user input provided to monitoring and alerting service 350 may include analyzing natural language user input provided to monitoring and alerting service 350 using at least an LLM.

Analyzing the sensor data collected from at least the set of IoT devices 306, 308, 310 and 312 may include analyzing sensor data collected from the set of IoT devices 306, 308, 310 and 312 and sensor data collected from one or more other sets of IoT devices of one or more other premises, respectively.

In 504, event generator 354 defines, based at least on the analyzing, an event whose occurrence can be monitored for using at least one or more IoT devices in the set of IoT devices 306, 308, 310 and 312.

In 506, event monitoring service 356 of monitoring and alerting service 350 monitors for an occurrence of the event using at least the one or more IoT devices in the set of IoT devices 306, 308, 310 and 312.

In 508, event monitoring service 356 detects the occurrence of the event based on the monitoring in 506.

In 510, alert generation service 358 generates an alert in response to the detection of the alert by event monitoring service 356 in 508.

Figure 6:
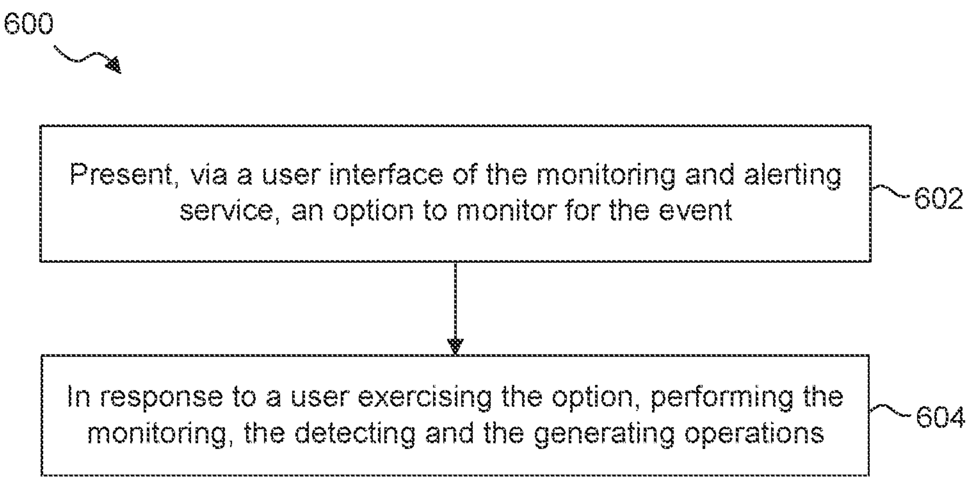
FIG. 6 illustrates a flow diagram of a method for enabling a user to activate monitoring and alerting services for an event, according to some embodiments.

FIG. 6 illustrates a flow diagram of a method 600 for enabling a user to activate monitoring and alerting services for an event, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 3. However, method 600 is not limited to that example embodiment.

In 602, monitoring and alerts manager 352 presents, via a user interface of monitoring and alerting service 350 (e.g., monitoring and alerts manager UI 316), an option to monitor for an event, such as the event defined in 504 of method 500.

In 604, in response to a user exercising the option presented in 602, event monitoring service 356 performs the monitoring and detecting operations referenced above in relation to 506 and 508 in method 500, and alert generation service 358 performs the generating operation referenced above in relation to 510 in method 500.

Figure 7:
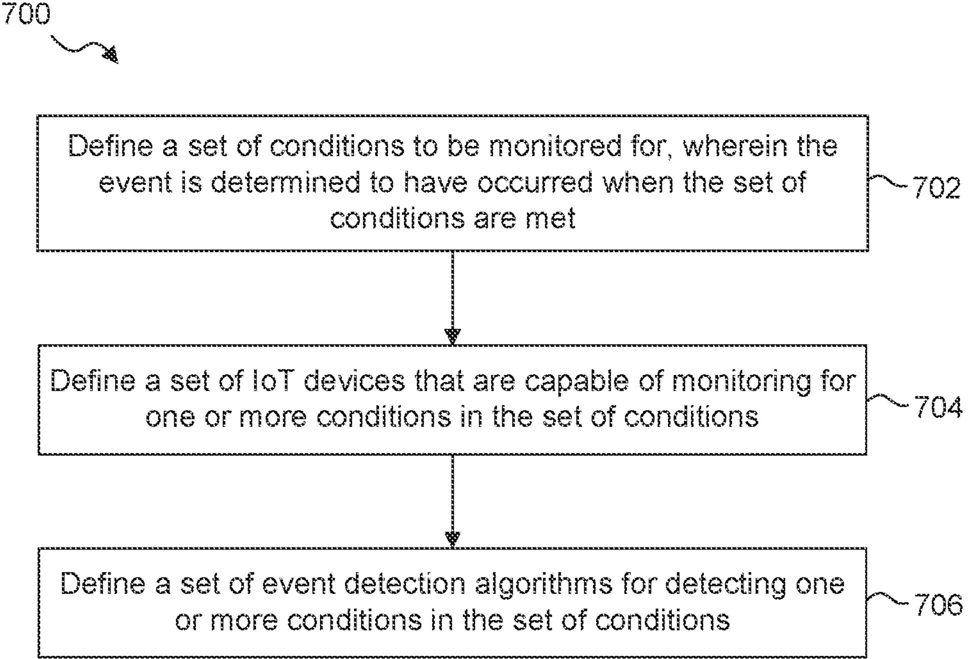
FIG. 7 illustrates a flow diagram of a method for defining an event whose occurrence can be monitored for using at least one or more IoT devices in a set of IoT devices, according to some embodiments.

FIG. 7 illustrates a flow diagram of a method 700 for defining an event whose occurrence can be monitored for using at least one or more IoT devices in a set of IoT devices, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIGS. 3 and 4. However, method 700 is not limited to that example embodiment.

In 702, event generator 354 of monitoring and alerting service 350 defines a set of conditions 402 to be monitored for, wherein the event is determined to have occurred when set of conditions 402 are met. The set of conditions to be monitored for may include both conditions that can be monitored for by one or more IoT devices within the premises and conditions that can be monitored for by accessing a data source external to the premises.

In 704, event generator 354 defines a set of IoT devices 404 that are capable of monitoring for one or more conditions in set of conditions 402.

In 706, event generator 354 defines a set of event detection algorithms 406 for detecting one or more conditions in set of conditions 402.

In a scenario in which the set of event detection algorithms includes an ML model, 706 may include training the ML model utilizing at least sensor data collected from one or more IoT devices in the set of IoT devices 306, 308, 310 and 312.

In a scenario in which the set of event detection algorithms includes an ML model, 706 may also include training the ML model utilizing at least sensor data collected from one or more IoT devices in a different set of IoT devices of a different premises.

Figure 8:
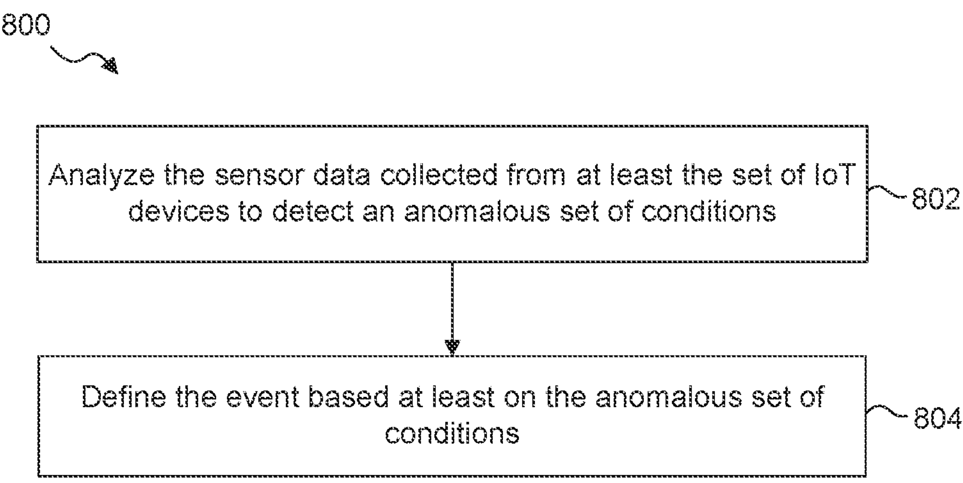
FIG. 8 illustrates a flow diagram of a method for defining an event whose occurrence can be monitored for using at least one or more IoT devices in set of IoT devices, according to some embodiments.

FIG. 8 illustrates a flow diagram of a method 800 for defining an event whose occurrence can be monitored for using at least one or more IoT devices in set of IoT devices, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

Method 800 shall be described with reference to FIG. 3. However, method 800 is not limited to that example embodiment.

In 802, event generator 354 of monitoring and alerting service 350 analyzes sensor data collected from at least the set of IoT devices 306, 308, 310 and 312 to detect an anomalous set of conditions.

In 804, event generator 354 defines the event based at least on the anomalous set of conditions.

Figure 9:
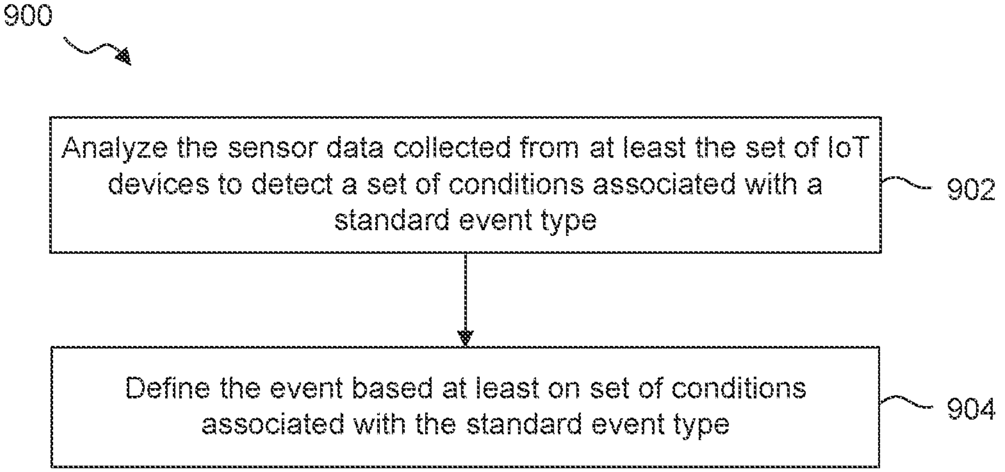
FIG. 9 illustrates a flow diagram of a method for defining an event whose occurrence can be monitored for using at least one or more IoT devices in set of IoT devices, according to some embodiments.

FIG. 9 illustrates a flow diagram of a method 900 for defining an event whose occurrence can be monitored for using at least one or more IoT devices in set of IoT devices, according to some embodiments. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art.

Method 900 shall be described with reference to FIG. 3. However, method 900 is not limited to that example embodiment.

In 902, event generator 354 of monitoring and alerting service 350 analyzes sensor data collected from at least the set of IoT devices 306, 308, 310 and 312 to detect a set of conditions associated with a standard event type.

In 904, event generator 354 defines the event based at least on the set of conditions associated with the standard event type.

Figure 10:
FIG. 10 illustrates a flow diagram of a method for generating an alert, according to some embodiments.
Figure 10:
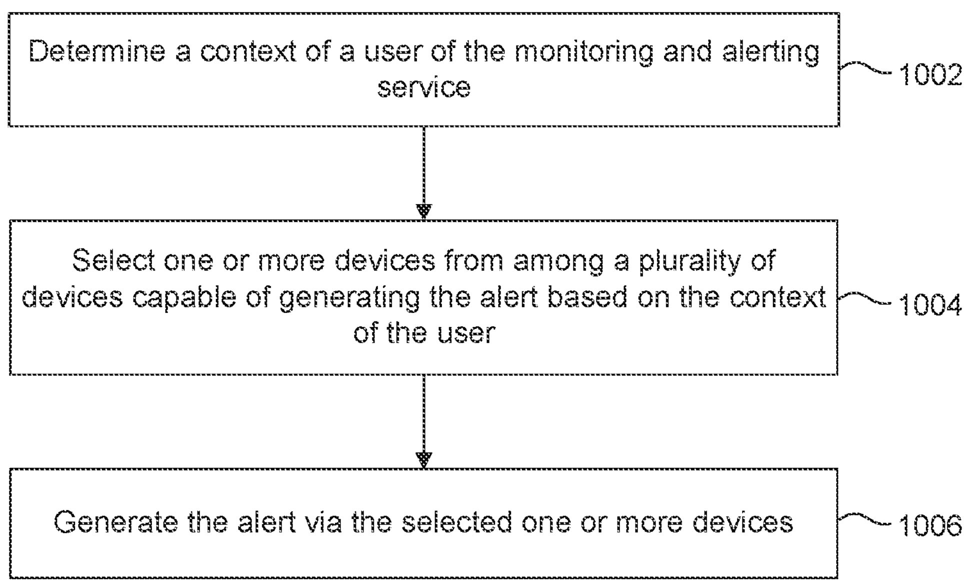

FIG. 10 illustrates a flow diagram of a method 1000 for generating an alert, according to some embodiments. Method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art.

Method 1000 shall be described with reference to FIG. 3. However, method 1000 is not limited to that example embodiment.

In 1002, alert generation service 358 of monitoring and alerting service 350 determines a context of a user of monitoring and alerting service 350.

In 1004, alert generation service 358 selects one or more devices from among a plurality of devices capable of generating the alert (e.g., from among user device 304 and IoT devices 306, 308, 310 and 312) based on the context of the user.

In 1006, alert generation service 358 generates the alert via the selected one or more devices.

Example Computer System

Figure 11:
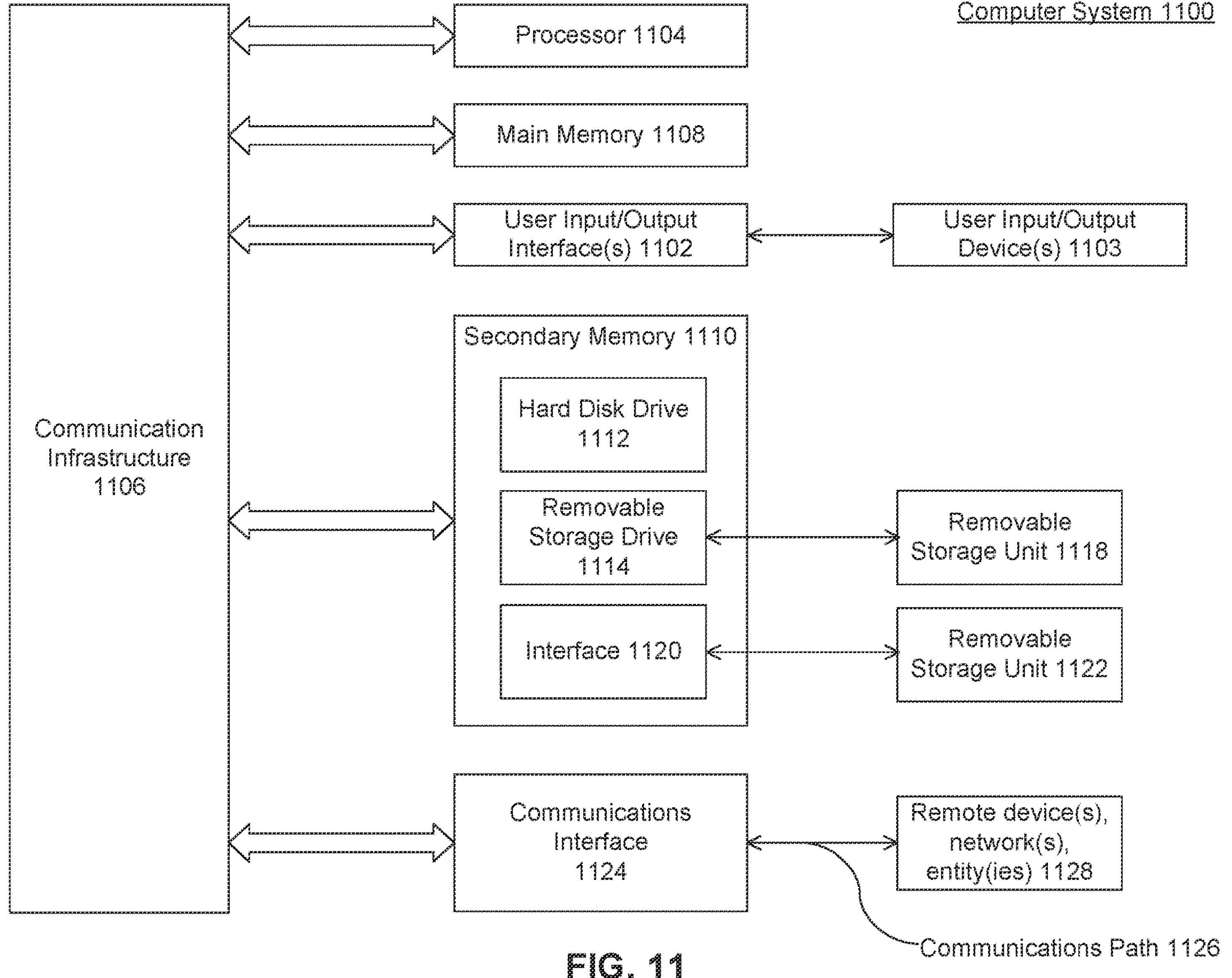
FIG. 11 illustrates an example computer system useful for implementing various embodiments.

Various embodiments may be implemented, for example, using one or more well-known computer systems, such as computer system 1100 shown in FIG. 11. For example, one or more of user device 304, IoT device 306, IoT device 308, IoT device 310, IoT device 312, monitoring and alerting service 350, monitoring and alerts manager 352, event generator 354, event monitoring service 356, alert generation service 358, or IoT device sensor data store 360 may be implemented using combinations or sub-combinations of computer system 1100. Also or alternatively, one or more computer systems 1100 may be used, for example, to implement any of the embodiments discussed herein, as well as combinations and sub-combinations thereof.

Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more of processors 1104 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 may include a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100 or processor(s) 1104), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression “coupled” and “connected” along with their derivatives. These terms are not necessarily intended as synonyms for each other. For example, some embodiments can be described using the terms “connected” and/or “coupled” to indicate that two or more elements are in direct physical or electrical contact with each other. The term “coupled,” however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for providing a monitoring and alerting service for a premises comprising a set of IoT devices, comprising:

analyzing, by at least one computer processor, one or more of user input provided to the monitoring and alerting service or sensor data collected from at least the set of IoT devices;

generating, based at least on the analyzing, a customized event for an unconnected device, wherein the unconnected device can be monitored using at least one or more IoT devices in the set of IoT devices, and wherein the unconnected device is incapable of communication with the set of IoT devices;

activating monitoring, in response to a user’s approval of monitoring the customized event, for an occurrence of the customized event using at least the one or more IoT devices in the set of IoT devices;

detecting the occurrence of the customized event based on the monitoring; and in response to detecting the occurrence of the customized event, generating an alert.

2. The computer-implemented method of claim 1, further comprising:

presenting, via a user interface of the monitoring and alerting service, an option to monitor for the customized event;

wherein the monitoring, the detecting, and the generating are performed in response to the user exercising the option.

3. The computer-implemented method of claim 1, wherein generating the customized event comprises defining one or more of:

a set of conditions to be monitored for, wherein the customized event is deemed to have occurred when the set of conditions are met;

a set of IoT devices that are capable of monitoring for one or more conditions in the set of conditions; or a set of customized event detection algorithms for detecting one or more conditions in the set of conditions.

4. The computer-implemented method of claim 3, wherein the set of customized event detection algorithms includes a machine learning (ML) model and wherein generating the set of customized event detection algorithms comprises:

training the ML model utilizing at least sensor data collected from one or more IoT devices in the set of IoT devices.

5. The computer-implemented method of claim 3, wherein the set of conditions to be monitored for includes at least one condition that is monitored for by accessing a data source external to the premises.

6. The computer-implemented method of claim 1, wherein analyzing the user input provided to the monitoring and alerting service comprises analyzing natural language user input provided to the monitoring and alerting service using at least a large language model (LLM).

7. The computer-implemented method of claim 1, wherein analyzing the sensor data collected from at least the set of IoT devices comprises analyzing the sensor data collected from at least the set of IoT devices to detect an anomalous set of conditions, and wherein generating the customized event based at least on the analyzing comprises generating the customized event based at least on the anomalous set of conditions.

8. The computer-implemented method of claim 1, wherein analyzing the sensor data collected from at least the set of IoT devices comprises analyzing the sensor data collected from at least the set of IoT devices to detect a set of conditions that are associated with a standard event type, and wherein generating the customized event based at least on the analyzing comprises generating the customized event based at least on the set of conditions associated with the standard event type.

9. The computer-implemented method of claim 1, wherein generating the alert comprises:

determining a context of the user of the monitoring and alerting service;

selecting one or more devices from among a plurality of devices capable of generating the alert based on the context of the user; and generating the alert via the selected one or more devices.

10. A system for providing a monitoring and alerting service for a premises comprising a set of Internet of Things (IoT) devices, comprising:

one or more memories; and at least one processor each coupled to at least one of the memories and configured to perform operations comprising:

analyzing one or more of user input provided to the monitoring and alerting service or sensor data collected from at least the set of IoT devices;

generating, based at least on the analyzing, a customized event for an unconnected device, wherein the unconnected device can be monitored using at least one or more IoT devices in the set of IoT devices, and wherein the unconnected device is incapable of communication with the set of IoT devices;

activating monitoring, in response to a user’s approval of monitoring the customized event, for an occurrence of the customized event using at least the one or more IoT devices in the set of IoT devices;

detecting the occurrence of the customized event based on the monitoring; and in response to detecting the occurrence of the customized event, generating an alert.

11. The system of claim 10, wherein the operations further comprise:

presenting, via a user interface of the monitoring and alerting service, an option to monitor for the customized event;

wherein the at least one processor is configured to perform the monitoring, the detecting, and the generating operations in response to the user exercising the option.

12. The system of claim 10, wherein generating the customized event comprises defining one or more of:

a set of conditions to be monitored for, wherein the customized event is deemed to have occurred when the set of conditions are met;

a set of IoT devices that are capable of monitoring for one or more conditions in the set of conditions; or a set of customized event detection algorithms for detecting one or more conditions in the set of conditions.

13. The system of claim 12, wherein the set of customized event detection algorithms includes a machine learning (ML) model and wherein generating the set of customized event detection algorithms comprises:

training the ML model utilizing at least sensor data collected from one or more IoT devices in the set of IoT devices.

14. The system of claim 12, wherein the set of conditions to be monitored for includes at least one condition that is monitored for by accessing a data source external to the premises.

15. The system of claim 10, wherein analyzing the user input provided to the monitoring and alerting service comprises analyzing natural language user input provided to the monitoring and alerting service using at least a large language model (LLM).

16. The system of claim 10, wherein analyzing the sensor data collected from at least the set of IoT devices comprises analyzing the sensor data collected from at least the set of IoT devices to detect an anomalous set of conditions, and wherein generating the customized event based at least on the analyzing comprises generating the customized event based at least on the anomalous set of conditions.

17. The system of claim 10, wherein analyzing the sensor data collected from at least the set of IoT devices comprises analyzing the sensor data collected from at least the set of IoT devices to detect a set of conditions that are associated with a standard event type, and wherein generating the customized event based at least on the analyzing comprises generating the customized event based at least on the set of conditions associated with the standard event type.

18. The system of claim 10, wherein generating the alert comprises:

determining a context of the user of the monitoring and alerting service;

selecting one or more devices from among a plurality of devices capable of generating the alert based on the context of the user; and generating the alert via the selected one or more devices.

19. A non-transitory computer-readable medium having instructions stored thereon that, when executed by at least one computing device, cause the at least one computing device to perform operations for providing a monitoring and alerting service for a premises comprising a set of Internet of Things (IoT) devices, the operations comprising:

analyzing one or more of user input provided to the monitoring and alerting service or sensor data collected from at least the set of IoT devices;

generating, based at least on the analyzing, a customized event for an unconnected device, wherein the unconnected device can be monitored using at least one or more IoT devices in the set of IoT devices, and wherein the unconnected device is incapable of communication with the set of IoT devices;

activating monitoring, in response to a user's approval of monitoring the customized event, for an occurrence of the customized event using at least the one or more IoT devices in the set of IoT devices;

detecting the occurrence of the customized event based on the monitoring; and in response to detecting the occurrence of the customized event, generating an alert.

20. The non-transitory computer-readable medium of claim 19, wherein generating the customized event comprises defining one or more of:

a set of conditions to be monitored for, wherein the customized event is deemed to have occurred when the set of conditions are met;

a set of IoT devices that are capable of monitoring for one or more conditions in the set of conditions; or a set of customized event detection algorithms for detecting one or more conditions in the set of conditions.

* * * * *